United States Patent [19]

Morinaga

[11] 4,377,600

[45] Mar. 22, 1983

[54] METHOD FOR PRODUCING DEODORIZED LIQUID GARLIC EXTRACT

[75] Inventor: Mitsuhiro Morinaga, Fukuoka, Japan

[73] Assignee: Mitsuteru Tomoda, Hyogo, Japan

[21] Appl. No.: 316,471

[22] Filed: Oct. 30, 1981

[51] Int. Cl.³ .................. A23L 1/221; A23L 1/28
[52] U.S. Cl. .................. 426/424; 260/236.6; 426/650; 426/655; 426/488
[58] Field of Search .............. 426/424, 422, 429, 650, 426/655, 488, 487; 260/236.6

[56] References Cited

U.S. PATENT DOCUMENTS 431,278  7/1890  Nellensteyn .................... 260/236.6

FOREIGN PATENT DOCUMENTS 48-24737  7/1973  Japan .................... 426/650

*Primary Examiner*—Raymond N. Jones
*Assistant Examiner*—George C. Yeung
*Attorney, Agent, or Firm*—Jordan and Hamburg

[57] ABSTRACT

Liquid garlic extract which is completely free from odor is disclosed. The method for producing such garlic extract is readily carried out by merely mixing any edible oil into the garlic juice squeezed from the garlic bulbs and hold the juice for a predetermined period in a vessel under a specific condition until the liquid garlic extract is precipitated completely. The resultant garlic extract has no unpleasant odor and acrid taste, which are the characteristics of the raw garlic juice.

4 Claims, No Drawings

METHOD FOR PRODUCING DEODORIZED LIQUID GARLIC EXTRACT

BACKGROUND OF INVENTION

The present invention relates to a liquid garlic extract which is free from the characteristic odor of raw garlic juice.

Garlic has long been utilized in everyday life as food stuff, seasoning and tonic nutrition and has recently found utility in cosmetics. It is also true, however, that most people dislike garlic because the characteristic odor is very strong. The characteristic odor is reportedly ascribed to allicin and related low-molecular breakdown products which are produced by alliinase from alliin, an active component of garlic.

Although many methods for deodorization of garlic have been proposed heretofore, they use heating, boiling, roasting, steaming, dehydrating or chemical treatment, resulting in severe loss of the nutritional value of raw garlic.

Accordingly, it is an object of the present invention to provide a liquid garlic extract which has no unpleasant odor and acrid taste which are characteristics of the raw garlic juice while completely maintaining the high nutritional value of the raw garlic.

It is another object of the present invention to provide a method for producing the deodorized liquid garlic extract which can produce such extract in an inexpensive manner without necessitating any larger sized or complicated production system.

DETAILED DESCRIPTION OF THE DISCLOSURE

The liquid garlic extract of the present invention and the method for producing the same will be described in details in view of the following experiment carried out by the inventor of the present invention.

Primarily, the garlic bulbs were squeezed in a known manner to produce the raw garlic juice.

Although the yield of squeezed juice relatively varies depending on the variety of garlic, the producing district and the time of harvest, 5–6 kg of raw juice can usually be obtained from 10 kg of garlic bulbs including their coatings. The juice was placed in a vessel and was held for 4–5 days therein at a temperature of 1° to 10° C. so that enzymatic reactions was prevented in the juice. If such enzyme reactions occur, the garlic juice produces much precipitate to become acidic.

Although the appearance of the garlic juice differs more or less depending on the variety of the starting material and the producing district, it usually is milky white immediately after squeezing and turns to be light brown in 4–5 days. At this stage of the method, 1–2 kg of edible oil was mixed into the garlic juice and was held again in the covered vessel for 40–60 days at a temperature of 1° to 10° C.

As edible oil, olive oil, soybean oil, cottonseed oil, corn oil, sesame oil, rapeseed oil, peanut oil, and camellia oil are considered.

On mixing with oil, the garlic juice gave thick and viscous milky white liquid mixture tinted with light brown. Four to five hours after holding in the cold vessel, semi-transparent brown liquid started to separate at the bottom of the vessel and gradually increased in amount. This liquid separation continued for about 15 days to give about 4.5 kg liquid extract. To be more in details, 90–95% of the total extract was separated in the first 2–3 days and the remaining 10–5% was produced very slowly for subsequent 13–12 days. Needless to say, the volume of the garlic-oil mixture decreased, as the liquid extract separated. About seven days after the liquid extract started to separate, the thick garlic-oil mixture slowly gelled to become exactly like mayonnaise in color and state.

The above liquid extract was an odorless garlic preparation obtained by the new deodorization method according to the present invention, and thus has no unpleasant odor and acrid taste which are the characteristic of raw garlic juice.

As described above, although the liquid separation ended in about 15 days, the deodorization process needed a further 25–45 days for completion. The odorless liquid extract of garlic thus obtained by the deodorization method of the present invention is satisfactorily acceptable to everyone, because the frequent uptake of the garlic liquid extract produces no mouth odor (more than 99.9% of the garlic odor is removed) which is unpleasant not only to the intaker but also to other people.

It is now apparent from the above-described explanation that the present invention is original and novel in that the unpleasant odor of garlic is removed by mixing raw pressed garlic juice with edible oil.

The following table shows the result of the comparative food analysis by a public hygienic center.

| COMPARATIVE ANALYSIS TABLE | | |
|---|---|---|
| | raw garlic juice | odorless garlic liquid extract of the present invention |
| water | 65.8% | 66.7% |
| ash | 1.6% | 1.5% |
| lipid | 0.1% | 0.4% |
| protein | 9.3% | 4.2% |
| carbohydrate | 23.2% | 27.2% |
| total calory | 131 cal. | 126.2 cal. |

The above-listed table clearly shows that no substantial difference in the nutritional value is observed between raw garlic juice and the odorless garlic liquid extract of the present invention.

What I claim is:

1. Method for producing deodorized liquid garlic extract substantially comprising
   (i) squeezing raw garlic bulbs to produce a raw garlic juice,
   (ii) holding said raw garlic juice at a temperature of above 1° to 10° C. in a container for a first predetermined period, effective to prevent enzymatic reactions in the juice,
   (iii) mixing an edible oil into said raw garlic juice,
   (iv) holding said mixture in said container at a temperature of above 1° to 10° C. in said container for a second predetermined period effective to produce a precipitated liquid garlic extract which is completely free from odor, and
   (v) collecting said precipitated liquid garlic extract from said mixture.

2. Method for producing deodorized liquid garlic extract according to claim 1, wherein said edible oil is one selected from the group of edible oils consisting of olive oil, soybean oil, cottonseed oil, corn oil, sesame oil, rapeseed oil, peanut oil and camellia oil.

3. Method for producing deodorized liquid garlic extract according to claim 1, wherein said first predetermined period is about 4 to 5 days.

4. Method for producing deodorized liquid garlic extract according to claim 1, wherein said second predetermined period is about 40 to 60 days.

* * * * *